United States Patent
Schüler et al.

(10) Patent No.: US 6,695,275 B2
(45) Date of Patent: Feb. 24, 2004

(54) LONGITUDINAL ADJUSTMENT DEVICE FOR VEHICLE SEATS

(75) Inventors: Rolf Schüler, Heiligenhaus (DE); Jürgen Stemmer, Remscheid (DE)

(73) Assignee: Deiper GmbH & Co., Kaiserslautern (DE)

( * ) Notice: Subject to any disclaimer, the term of this patent is extended or adjusted under 35 U.S.C. 154(b) by 0 days.

(21) Appl. No.: 10/110,652

(22) PCT Filed: Jul. 28, 2001

(86) PCT No.: PCT/EP01/08773

§ 371 (c)(1), (2), (4) Date: Jul. 8, 2002

(87) PCT Pub. No.: WO02/14102

PCT Pub. Date: Feb. 21, 2002

(65) Prior Publication Data

US 2003/0042387 A1 Mar. 6, 2003

(30) Foreign Application Priority Data

Aug. 16, 2000 (DE) .......................................... 100 40 594

(51) Int. Cl.⁷ .......................... F16M 13/00; A47C 1/02
(52) U.S. Cl. ...................... 248/424; 248/429; 297/341; 297/344.13
(58) Field of Search ................................ 248/424, 429, 248/430, 419, 420, 422; 297/341, 344.13

(56) References Cited

U.S. PATENT DOCUMENTS 4,378,927 A * 4/1983 Graves ........................ 248/561
4,615,551 A * 10/1986 Kinaga et al. ............... 297/341

(List continued on next page.)

FOREIGN PATENT DOCUMENTS

| DE | 3442159 A1 | * | 5/1986 |
| DE | 4201829 | | 5/1993 |
| FR | 2356043 | | 1/1978 |
| FR | 2530557 | | 1/1984 |
| JP | 06092168 A | * | 4/1994 |
| JP | 06099768 A | * | 4/1994 |

OTHER PUBLICATIONS

Patent Abstracts of Japan, vol. 1998, No. 2, Jan. 30, 1998 & JP 09 267671 A (Tachi S Co Ltd), Oct. 1997.
Patent Abstracts of Japan, vol. 1999, No. 9, Jul. 30, 1999 & JP 11 099857 A (Tachi S Co Ltd), Apr. 13, 1999.
Patent Abstracts of Japan, vol. 1999, No. 11, Sep. 30, 1999 & JP 11 151961 A (Ikeda Bussan Co Ltd), Jun. 8, 1999.

*Primary Examiner*—Anita King
*Assistant Examiner*—Naschica S. Morrison
(74) *Attorney, Agent, or Firm*—Friedrich Kueffner (57) ABSTRACT

The present invention pertains to a longitudinal adjustment device for vehicle seats, in which the seat is attached along each of its long sides to runner rails 10, mounted with freedom to slide in guide rails 15, which are attached to the vehicle. Each runner rail 10 has a locking device, which can be released from its connection to the guide rail 15. The locking device comprises a release lever 21, 22, supported with freedom to swivel on each runner rail 10, to move the device into its released position, which lever is to be shifted via rods 31, 32 of an actuating element 30 supported on the runner rails 10. The adjusting moment exerted on the actuating element 30 is transmitted to the rods 31, 32 via a differential, where the rods 31, 32 are disconnected from each other. As a result, each rod can be moved until the locking device has been moved completely into the position in which it is released.

8 Claims, 7 Drawing Sheets

U.S. PATENT DOCUMENTS

| | | | | |
|---|---|---|---|---|
| 4,629,254 A | * | 12/1986 | Stolper et al. | 297/473 |
| 4,635,890 A | * | 1/1987 | Matsuda et al. | 248/429 |
| 4,660,795 A | * | 4/1987 | Ikegaya et al. | 248/430 |
| 4,730,804 A | * | 3/1988 | Higuchi et al. | 248/429 |
| 4,852,846 A | * | 8/1989 | Weier | 248/430 |
| 4,927,110 A | * | 5/1990 | Tsumura et al. | 248/430 |
| 4,958,799 A | * | 9/1990 | Clauw et al. | 248/430 |
| 4,961,559 A | * | 10/1990 | Raymor | 248/429 |
| 5,076,528 A | * | 12/1991 | VanDuser | 248/419 |
| 5,076,529 A | * | 12/1991 | Dove et al. | 248/429 |
| 5,082,228 A | * | 1/1992 | Shimazaki | 248/430 |
| 5,425,522 A | * | 6/1995 | Retzlaff | 248/429 |
| 5,520,362 A | * | 5/1996 | Gerlach | 248/429 |
| 5,683,140 A | * | 11/1997 | Roth et al. | 297/344.1 |
| 5,855,349 A | * | 1/1999 | Nini et al. | 248/429 |
| 5,918,846 A | * | 7/1999 | Garrido | 248/429 |
| 5,964,442 A | * | 10/1999 | Wingblad et al. | 248/429 |
| 6,170,790 B1 | * | 1/2001 | Schuler et al. | 248/430 |
| 2003/0042387 A1 | * | 3/2003 | Schuler et al. | 248/424 |

* cited by examiner

LONGITUDINAL ADJUSTMENT DEVICE FOR VEHICLE SEATS

BACKGROUND OF THE INVENTION

1. Field of the Invention

The invention pertains to a longitudinal adjustment device on a vehicle seat in which each side of the seat is attached to runner rails, which are mounted so that they are free to slide in guide rails attached to the vehicle, and where each runner rail has a locking device, which can be released from its connection to the guide rail, which locking device comprises a release lever supported with freedom to swivel on each runner rail for moving the device into its released position, this lever being shifted via rods of an actuating element supported on the runner rails.

2. Description of the Related Art

A longitudinal adjustment device of the type indicated above is known from DE 198-27,068 C1, in which the ends of the release levers cooperating with the rods of the actuating element extend at an angle to the horizontal along the associated runner rails. The rods of the actuating element are supported in the bearing seats on the runner rails in such a way that they are able not only to swivel but also to slide in the axial direction. This arrangement makes it possible to compensate for the elasticity of the components in the path along which the forces flow upon actuation of the longitudinal adjustment device by a handle on the seat back, which leads to the direct release of the latching claws on one of the long sides of the seat. As a result of this compensation, the latching claws on the other long side of the seat can also be released. Nevertheless, there is no compensation in the case of the object of DE 198-27,068 C1 for the overstroke which can occur as a result of differences in the manufacturing tolerances at the latching claws.

That is, as a result of manufacturing tolerances, it is possible that the release lever on the left side of the seat must travel a longer distance to release the latching claw than the release lever on the right side of the seat must travel. This means that, when the release levers are actuated via the rods by an actuating element, it is possible that, after the lever has traveled a certain distance, the first latching claw is released and the runner rail becomes free to slide along the guide rail before the latching claw of the locking device on the other side is released. So that this second locking claw can also be released completely from its locked position, the lever must travel a certain additional distance. This is not possible with the known longitudinal adjustment device, because no provisions are made to allow for this overstroke.

In the case of the longitudinal adjustment device known from DE 198-27,065 A1, the elasticity of the actuating element is to be compensated by a spring element mounted on a rod of the actuating element. One end of the spring is attached to the rod, whereas the other end engages with the end of a release lever of a locking device on a runner rail of the seat.

The disadvantage here, however, is that the ability to compensate for manufacturing tolerances is available only on one of the rods of the actuating element. If, as a result of tolerances at the latching claw of the locking element, a certain overstroke is required precisely on the side on which the spring element is provided, the actuating element cannot be actuated to the point of complete release, because the locking element on the other side of the seat may already be located in its end position.

SUMMARY OF THE INVENTION

The task of the present invention is therefore to improve a longitudinal adjustment device of the type indicated above in such a way that sufficient compensation for tolerances at the latching claws is ensured along with sufficient compensation of the resulting overstroke, so that the locking device can be released reliably and completely on both rails of the seat.

This task is accomplished in that the adjusting moment exerted on the actuating element is transmitted to the rods via a differential, where the rods are disconnected from each other. According to these features, it is sufficient to provide a means for disconnecting the rods from each other along the route by which the adjusting movement is transmitted from the actuating element to the rods which actuate the release lever of the locking device on the rail. As a result of this measure, a rod which, as a result of tolerances, must travel a greater distance than the other rod before completely releasing the locking device during the adjustment process, can be shifted even farther by way of the actuating element, even if the rod with the shorter adjusting distance has already reached the end position of the locking device and thus cannot be moved any farther. As a result of the measure according to the invention, the goal is therefore achieved that both locking devices on the seat can be moved completely out of their locking position and into the released position by the disconnected rods. In this released position, the seat can then be adjusted longitudinally without friction.

In an advantageous embodiment, the means for disconnecting the rods from each other comprises a lever, which has a swivel axis which is centered with respect to the lever, on which axis one end of the actuating element is supported. The lever, which is supported with freedom to swivel on one end of the actuating element, has two arms, which extend away from the centrally located swivel axis. The radially outer ends of the lever arms are in actuating connection with the rods. When the rods are actuated by the compensating lever via the actuating lever, the two rods are first shifted uniformly downward. After one of the rods has reached its end position, the other rod can still continue to move, because the compensating lever tilts around the swivel axis on the actuating lever, which thus allows the second rod to move further downward until it completely releases the locking device assigned to it.

According to another embodiment, it is also favorable for the rods to be mounted on a transverse tube in such a way that they can both swivel and slide, because as a result it becomes possible to reduce the distance between the two rods when the compensating lever tilts. This swiveling and sliding arrangement prevents the rods from getting jammed on the transverse tube.

The functionality of the rods can be improved even more by mounting them on the transverse tube by way of support tubes, as a result of which the rods are supported on the transverse tube in a way which prevents them from tilting.

In another embodiment of the invention, additional rods are provided at the ends of the two support tubes which face the actuating element. The end of each of these rods passes through an opening in the end of the associated lever arm of the compensating lever and thus enters into a working connection with the compensating lever. AS a result of this measure, the length of the compensating lever can be reduced, and the lever thus acquires greater rigidity.

In another embodiment according to the invention, the differential is designed as a planetary gear system. In this case, the transverse tube is divided into two parts, and these two parts of the transverse tube represent the first and second takeoffs of the planetary gear system. The first takeoff is connected nonrotatably to one of the rods, whereas the second takeoff is connected nonrotatably to the second rod. The two takeoffs, i.e., the two parts of the transverse tube, are supported rotatably one inside the other, so that the two takeoffs are able to rotate relative to each other. The planetary gear system can consist of an internal gear, which is mounted nonrotatably on the one takeoff; a spur gear, which is attached nonrotatably to the second takeoff; and a planet wheel, also supported rotatably between the internal gear and the spur gear. This planet wheel can be supported on the actuating lever, which is itself supported rotatably on a takeoff (a part of the transverse tube) on the spur gear side. In this embodiment of the invention, the two rods can also be disconnected very reliably from each other without the need for a large amount of effort in terms of either material or production work.

BRIEF DESCRIPTION OF THE DRAWINGS

Additional measures and advantages of the invention can be derived from the subclaims, from the following description, and from the drawings. Three exemplary embodiments of the invention are illustrated in the drawings:

DESCRIPTION OF PREFERRED EMBODIMENTS

FIGS. 1–3c show the invention on the basis of a first exemplary embodiment. Not shown in these figures is the seat part, which is connected by a piece of known adjusting hardware to a seat back. The base frame of the seat part can be rigidly attached along its two long sides to the runner rails 10, shown in the figures, which are part of a rail assembly, one of which is provided along each long side of the seat. Each rail assembly comprises not only the runner rail 10 but also a guide rail 15, attached to the floor of the vehicle, in which the runner rail can slide in the longitudinal direction after a locking device 11, 12 has been released. The locking device 11, 12 is to be released by actuating components.

Figure 1:
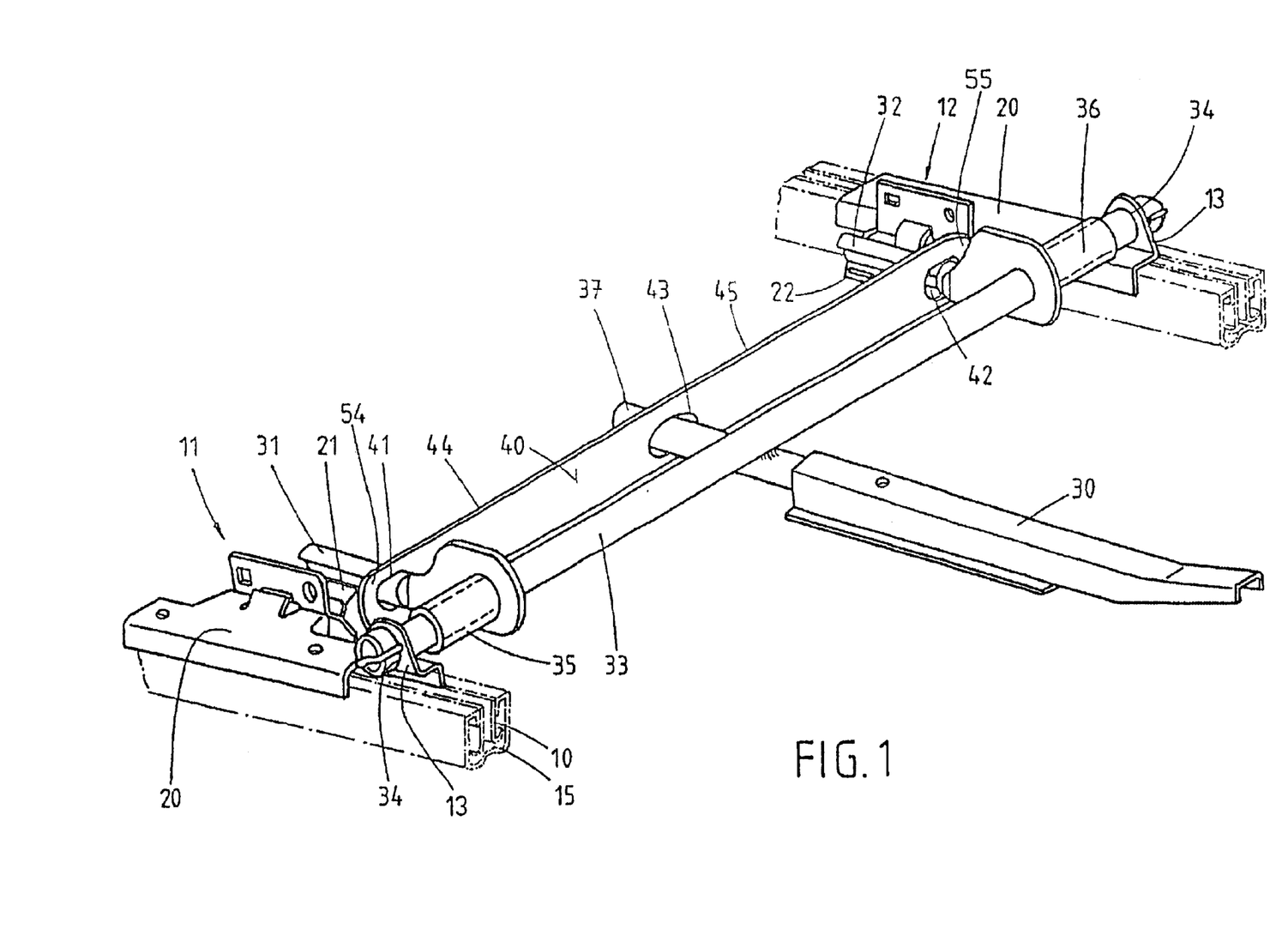
FIG. 1 shows a longitudinal adjustment device according to the invention on the basis of two schematically illustrated runner rail-guide rail pairs.

These actuating components include in particular an actuating lever 30, which is rigidly connected to the transverse tube 33 and which is supported on the runner rails 10 by way of the transverse tube 33. In the present exemplary embodiment, one end 37 of this lever passes through an axial opening 43 in a lever 40. The transverse tube 33 is rotatably supported in the bearing seats 34 of the support brackets 13. The bearing brackets 13 are here a part of a component/plate 20, one of which is connected to each runner rail 10. The plate 20 is a part of the locking device 11, 12, which, in the present exemplary embodiment, comprises means in the interior part of the runner rail 10 suitable for locking the runner rail 10 to the guide rail 15 when in the locking position and for allowing the runner rail 10 to slide with respect to the guide rail 15 when in the released position. So that it can be released, the locking device 11, 12 has a release lever 21, 22, which can be actuated via the actuating lever 30 by a rod 31, 32 mounted on the transverse tube 33. The rods 31, 32 are supported on the transverse tube 33 in such a way that they can move in the axial direction and also swivel and are rigidly connected to the support tubes 35 and 36, which prevent the rods 31, 32 from tilting and jamming at their support points on the transverse tube 33.

The opposite ends of the rods 31, 32 extend beyond the ends 23, 24 of the release levers 21, 22.

The previously mentioned lever 40 has two arms 44, 45, which, when in the rest position of the lever 40, are approximately parallel to the transverse tube 33, but are offset slightly from it. Openings 41, 42 in the lever 40 are provided at the ends 54, 55 of the arms 44, 45. The rods 31, 32 pass through these openings 41, 42, which also serve as swivel bearings for the lever 40 on the rods 31, 32.

Figure 3A:
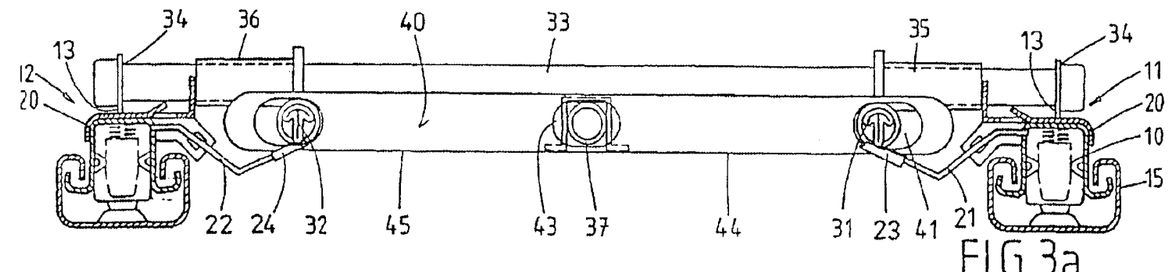
FIG. 3a shows the longitudinal adjustment device according to the invention in a view from the rear, looking onto the compensating lever and the ends of the rods, before the actuation of the lever.

The way in which the locking device according to the invention works will now be explained on the basis of FIGS. 3a–3c. FIG. 3a shows a longitudinal adjustment device according to the invention, in which the locking devices 11, 12 are shown in their locking position. No adjusting moment is being exerted on the lever 40 by the actuating lever 30. The rods 31, 32, however, are resting on the ends 23, 24 of the release levers 21, 22.

Figure 3B:
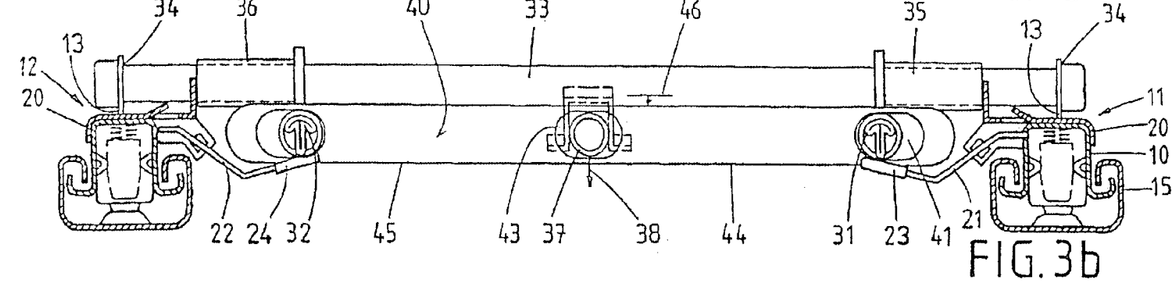
FIG. 3b is a diagram similar to FIG. 3a, except that here the actuating lever has been shifted by a first actuating distance.
Figure 3C:
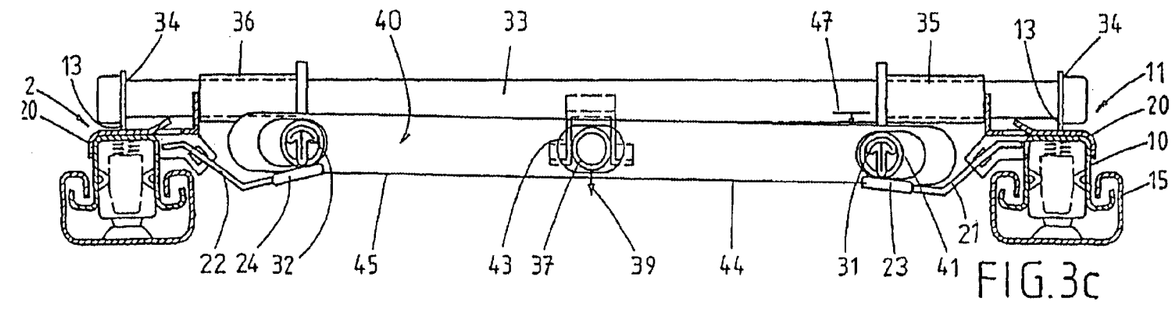
FIG. 3c is a diagram similar to FIGS. 3a and 3b, except that there the actuating lever has been shifted by an additional actuating distance.

In FIG. 3b, the user of the vehicle seat, who wants to adjust its longitudinal position, actuates the actuating lever 30, so that the end 37 of the actuating lever moves down in the actuating direction 38. The end 37 of the actuating lever thus presses the lever 40 down by the adjusting distance 46. As the lever 40 moves downward, its arms 44, 45 carry the rods 31, 32 supported in the openings 41, 42 along with it; these rods in turn actuate the release levers 21, 22. In the end position according to FIG. 3b, it is now assumed that the rod 32 has already moved the release lever 22 into its end position, in which the locking device 12 is completely released. As a result of manufacturing tolerances, however, the release lever 21 on the locking device 11 is not yet completely shifted into its released position. An additional actuating distance is now required to release the second locking device completely also. FIG. 3c now shows how the actuating lever 30 is moved an additional distance in an actuating direction 39. The end 55 of the lever arm 45 does not move downward any farther; instead, there is only a swiveling movement around the bearing consisting of the opening 42 and the rod 32. A swiveling movement also occurs in the bearing between the axial opening 43 and the end 37 of the actuating lever 30. This swiveling movement causes the end 54 of the arm 44 to move downward by the adjusting distance 47. As a result, the rod 31 and the release lever 21 are moved further downward to complete the actuation of the locking device 11 and to move it into the position in which it is completely released. In the end position shown in FIG. 3c, both locking devices 11, 12 on the sides of the seat are now in their released state, and it is thus now possible to adjust the longitudinal position of the seat.

Figure 2:
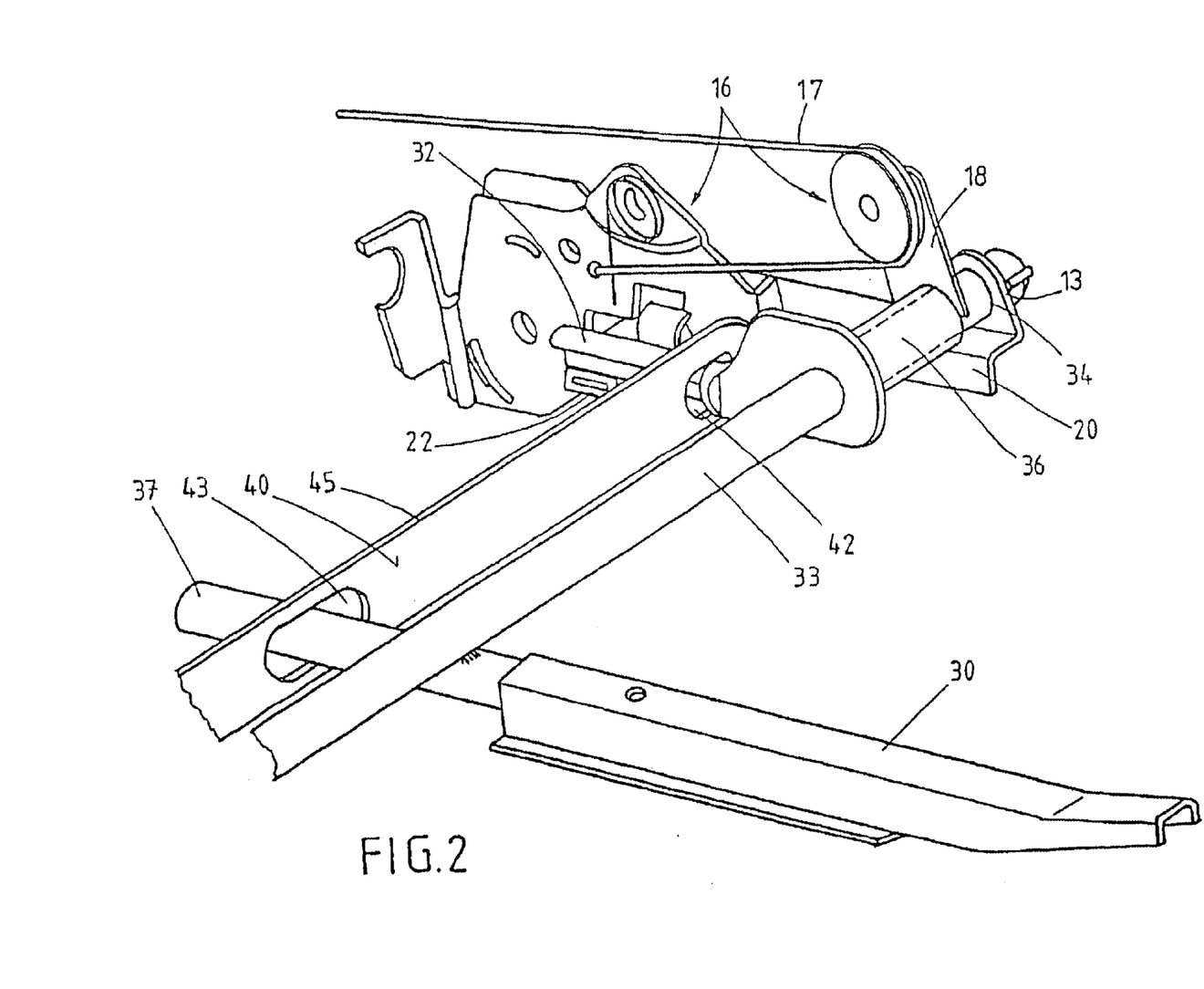
FIG. 2 shows a section of the embodiment of the invention illustrated in FIG. 1, in which, however, an "easy-entry" device, as a variant of the design according to FIG. 1, acts on the left seat rail.
Figure 2A:
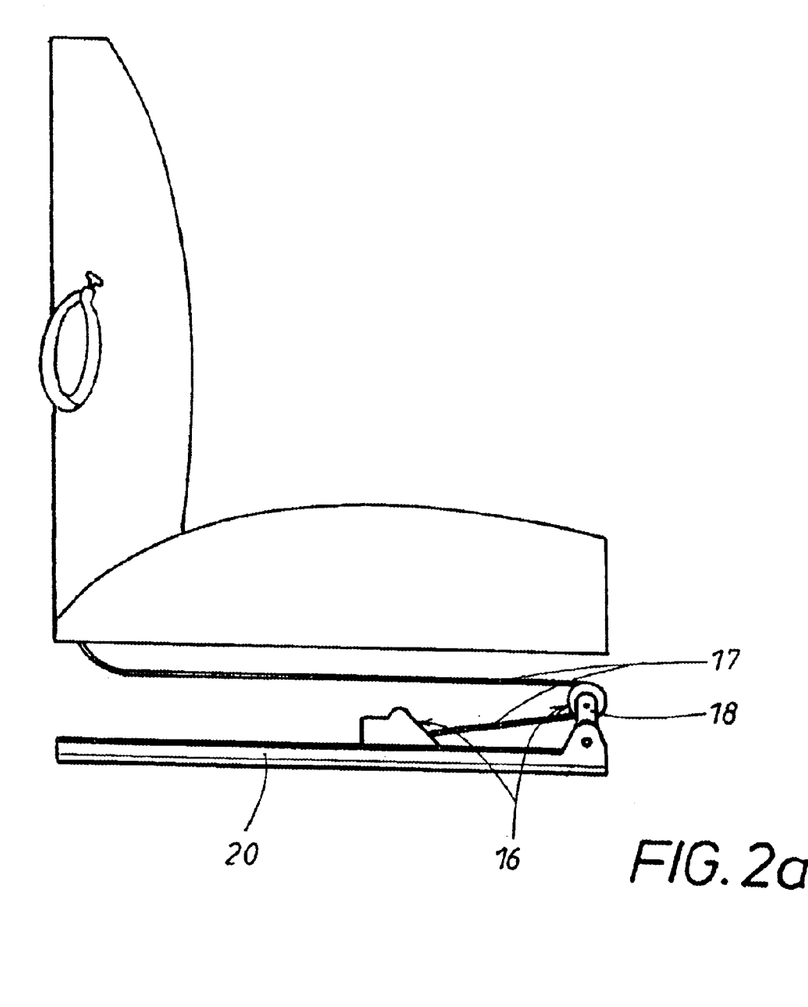
FIG. 2a shows schematically a lever element of an easy-entry device mounted on a transverse tube, which element can be actuated by a cable pull, which is in working connection with a release lever attached to the seat back.

FIG. 2 shows that the longitudinal adjustment device according to the invention can also be actuated by way of an easy-entry device 16, which acts on the transverse tube 33, rigidly connected in turn to the actuating lever 30. The easy-entry device is actuated via a lever on the seat back (not graphically illustrated here). As a result of this actuation, a lever 18 is actuated by a cable pull 17, and thus the end 37 of the actuating lever 30 is also swiveled downward via the transverse tube 33. As a result of this pulley arrangement, the force in the cable pull is reduced by half. All the other functions are the same as those of the longitudinal adjustment device according to the invention just described.

Figure 4:
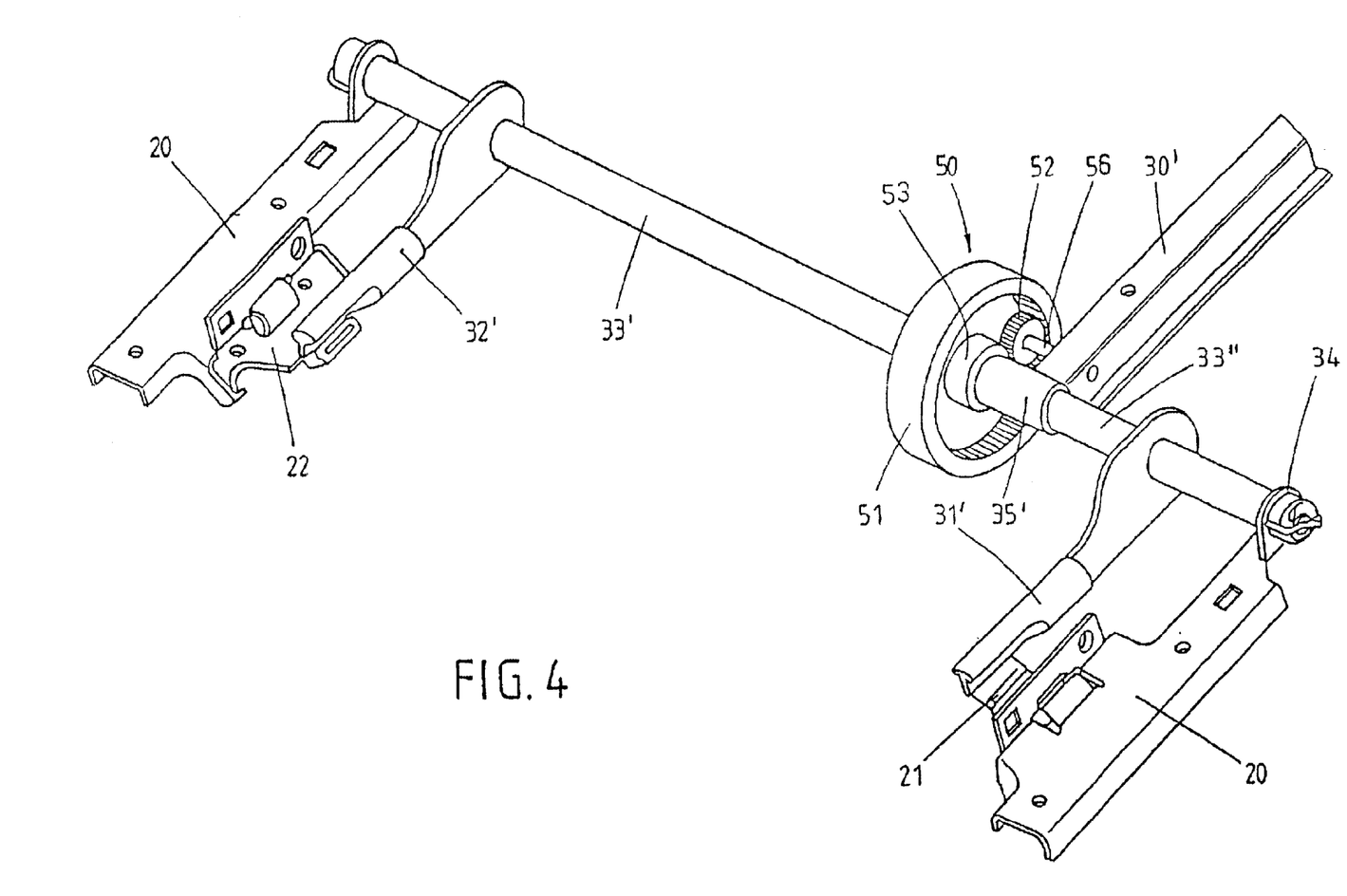
FIG. 4 shows a second embodiment of the longitudinal adjustment device according to the invention.
Figure 5:
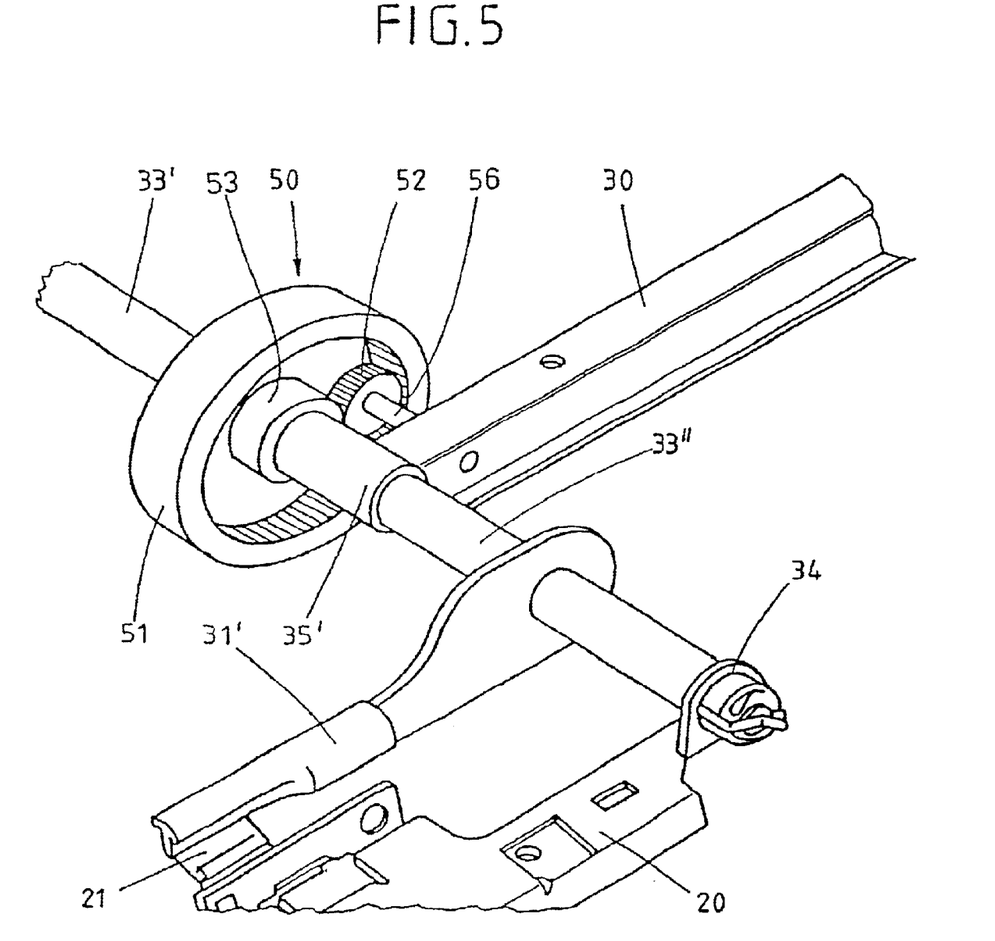
FIG. 5 shows an enlarged view of a section of the second embodiment of the longitudinal adjustment device.

FIGS. 4 and 5 show another embodiment of the longitudinal adjustment device according to the invention. In this embodiment, the transverse tube already known is divided into the two sections 33' and 33". These are supported in the bearing seats 34 in the plates 20. The rod 31' is connected nonrotatably to the transverse tube section 33", whereas the rod 32' is connected nonrotatably to the transverse tube section 33'. At the end facing the transverse tube, the actuating lever 30' has a support tube 35', by means of which it is supported rotatably on the transverse tube section 33". The support tube 35' can be held in position on the transverse tube section 33" by suitable means. To transmit the adjusting motion from the actuating lever 30' to the transverse tube sections 33', 33", a planetary gear system 50 is provided. An internal gear 51 of the planetary gear system 50 is connected nonrotatably to the transverse tube section 33', whereas a spur gear 53 is connected nonrotatably to the transverse tube section 33". Between the internal surface of the internal gear 51 and the spur gear 53, a planet wheel 52 is provided, which is seated on a fixed link 56, mounted in the lower area of the actuating lever 30'. When the actuating lever 30' is pulled upward by the user to adjust the seat, the internal gear 51 and the spur gear 53 are both carried along by the same distance via the planet wheel 52, and thus the rods 32', 31' mounted on the transverse tube sections 33', 33" are moved by a corresponding amount. When one of the rods 31', 32' reaches its end position and cannot be moved any farther, the movement is disconnected in the planetary gear system 50, so that the planet wheel carries only the gear 51 or only the gear 53 along with it, depending on which one is still free to move. This gear 51 or 53 can continue to move until the corresponding rod 31' or 32' has also reached its end position and the locking device has reached the position of complete release.

Figure 6:
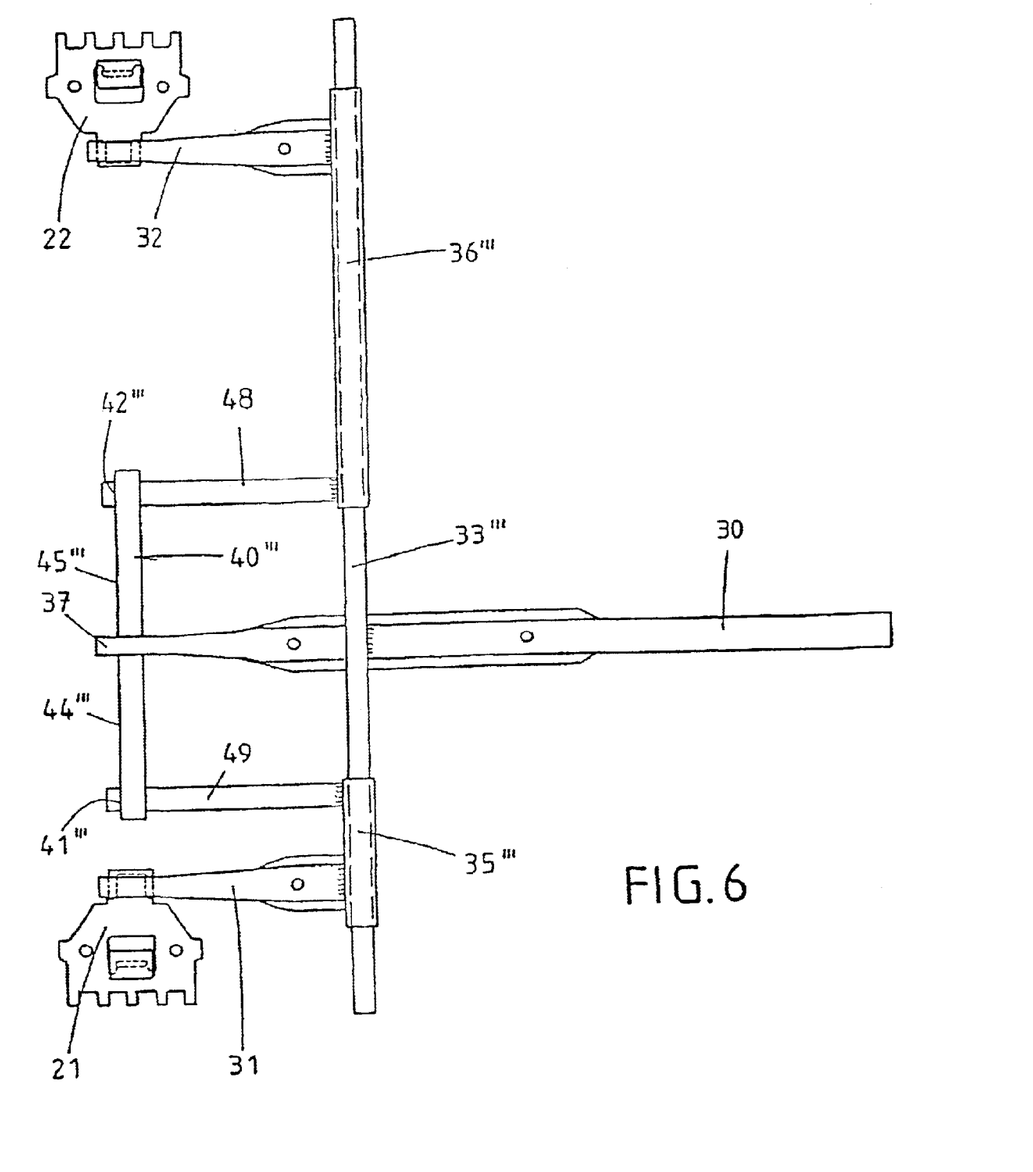
FIG. 6 shows a third embodiment of the longitudinal adjustment device according to the invention, based on the first embodiment, in a schematic view looking down from above.

FIG. 6 shows another embodiment, which is essentially the same as the first embodiment of the longitudinal adjustment device according to the invention. In this embodiment, however, two extended-length support tubes 35'" and 36'" are provided on a transverse tube 33'", which is attached to and supported on the runner rails in the manner previously described. Rods 31 and 32 are rigidly connected to these support tubes 35'", 36'", and are in working connection with the release levers 21 and 22. Additional rods 49, 48, however are attached to these support tubes 35'", 36'", at the ends facing the actuating lever 30. These rods pass through the openings 42'", 41'" in the lever 40'", which can be adjusted via the actuating lever in the manner already known from the first exemplary embodiment. The lever arms 45'", 44'" of the lever 40'" are shorter than those of the first exemplary embodiment. The lever 40'" is therefore stiffer and is less susceptible to damage from overactuation by the user.

It remains only to remark that the embodiments shown represent only examples of ways in which the invention can be realized. The invention is not, however, limited to them. It is obvious that the illustrated components of the invention could be made of any material accessible to the expert.

| List of Reference Numbers | |
| --- | --- |
| 10 | runner rail |
| 11 | locking device |
| 12 | locking device |
| 13 | bearing bracket |
| 15 | guide rail |
| 16 | easy-entry device |
| 17 | cable pull |
| 18 | lever element |
| 20 | plate/component |
| 21 | release lever |
| 22 | release lever |
| 23 | end of lever |
| 24 | end of lever |
| 30 | actuating lever/actuating element |
| 30' | actuating lever/actuating element |
| 31 | rod |
| 31' | rod |
| 32 | rod |
| 32' | rod |
| 33 | transverse tube |
| 33' | transverse tube, 1st section/takeoff |
| 33" | transverse tube, 2nd section/takeoff |
| 33'" | transverse tube |
| 34 | bearing seat (for the transverse tube on the plate 20) |
| 35 | support tube |
| 35' | support tube (for 30') |
| 35'" | support tube |
| 36 | support tube |
| 36'" | support tube |
| 37 | end of 30 |
| 38 | actuating device |
| 39 | actuating device |
| 40 | lever element/compensating lever |
| 40'" | lever element/compensating lever |
| 41 | opening/slot |
| 41'" | opening/slot |
| 42 | opening/slot |
| 42'" | opening/slot |
| 43 | axial opening/swivel axis |
| 44 | lever arm |
| 44'" | lever arm |
| 45 | lever arm |
| 45'" | lever arm |
| 46 | adjusting distance |
| 47 | adjusting distance |
| 48 | adjusting rod/rod |
| 49 | adjusting rod/rod |
| 50 | planetary gear system/transmission means |
| 51 | internal gear |
| 52 | planet wheel |
| 53 | spur gear |
| 54 | end of lever arm 44 |
| 55 | end of lever arm 45 |
| 56 | fixed link |

What is claimed is:

1. Longitudinal adjustment device for vehicle seats, in which each side of the seat is attached to runner rails, which are mounted so that they are free to slide in guide rails attached to the vehicle, and where each runner rail has a locking device, which can be released from its connection to one of the guide rails, which locking device comprises a release lever supported with freedom to swivel on each runner rail for moving the device into its released position, the release lever being shifted via rods of an actuating element supported on the runner rails, wherein an adjusting moment exerted on the actuating element (30) is transmitted to the rods (31, 31'; 32, 32') via a differential, where the rods (31, 31'; 32, 32') are disconnected from each other.

2. Longitudinal adjustment device according to claim 1, wherein the differential comprises a compensating lever (40, 40''') with two lever arms (44, 44'''; 45, 45'''), which proceed from a preferably centrally located swivel axis (43), the radial outer ends (54, 55) of the arms being in actuating contact with the rods (31, 32), and where the adjusting moment can be transmitted from the actuating element (30) at the swivel axis (43) to the compensating lever (40, 40''').

3. Longitudinal adjustment device according to claim 1, wherein the two rods (31, 32) are mounted on a transverse tube {33, 33''') with freedom to swivel and slide, which tube is supported with freedom to swivel on bearing seats (34), which are in the form of openings in bearing brackets (13) attached to the runner rails (10).

4. Longitudinal adjustment device according to claim 1, wherein slots (41, 41'''; 42, 42''') are provided at lever ends (23, 24) of the release lever, through which slots the ends of the rods (31, 32) extend.

5. Longitudinal adjustment device according to claim 3, wherein the rods (31, 32) are mounted on the transverse tube (33, 33''') by way of support tubes (35, 35'''; 36, 36''') and are rigidly connected to the support tubes (35, 35'''; 36, 36''').

6. Longitudinal adjusting device according to claim 5, wherein, at the ends of the support tubes (35''', 36''') facing the actuating element, there is an additional rod (48, 49) provided, the additional rod (48, 49) being in working connection with the lever ends (54, 55) of the lever arms (44''', 45''') of the compensating lever (40''').

7. Longitudinal adjustment device according to claim 1, wherein the differential comprises a planetary gear system (50), having a first takeoff (33') connected nonrotatably to one of the rods (32') and having a second takeoff (33") being connected nonrotatably to the second rod (31').

8. Longitudinal adjustment device according to claim 3, wherein a lever element (18) of an easy-entry device (16) is mounted on the transverse tube (33), wherein the lever element (18) can be actuated by a cable pull (17), which is in working connection with a release lever attached to the seat back.

* * * * *

UNITED STATES PATENT AND TRADEMARK OFFICE
CERTIFICATE OF CORRECTION

PATENT NO. : 6,695,275 B2
DATED : February 24, 2004
INVENTOR(S) : Rolf Schüler et al.

It is certified that error appears in the above-identified patent and that said Letters Patent is hereby corrected as shown below:

<u>Title page,</u>
Item [73], Assignee, change to -- Keiper GmbH & Co., Kaiserslautern (DE) --

Signed and Sealed this

Twentieth Day of July, 2004

JON W. DUDAS
*Acting Director of the United States Patent and Trademark Office*